US009916771B2

(12) United States Patent
Siminou (10) Patent No.: US 9,916,771 B2
(45) Date of Patent: Mar. 13, 2018

(54) PORTABLE VISION AID WITH MOTION PAN (71) Applicant: ENHANCED VISION SYSTEMS, INC., Huntington Beach, CA (US)

(72) Inventor: Kamran Siminou, Newport Coast, CA (US)

(73) Assignee: ENHANCED VISION SYSTEMS, INC., Huntington Beach, CA (US)

( * ) Notice: Subject to any disclaimer, the term of this patent is extended or adjusted under 35 U.S.C. 154(b) by 202 days.

(21) Appl. No.: 15/053,912

(22) Filed: Feb. 25, 2016

(65) Prior Publication Data
US 2017/0249859 A1 Aug. 31, 2017

(51) Int. Cl.
G09B 21/00 (2006.01)
G06F 1/16 (2006.01)
H04N 5/225 (2006.01)
H04N 5/232 (2006.01)

(52) U.S. Cl.
CPC .......... G09B 21/008 (2013.01); G06F 1/163 (2013.01); H04N 5/2259 (2013.01); H04N 5/23212 (2013.01); H04N 5/23293 (2013.01); H04N 5/23296 (2013.01); H04N 5/2252 (2013.01); H04N 5/2253 (2013.01); H04N 5/2254 (2013.01); H04N 5/23241 (2013.01)

(58) Field of Classification Search
CPC .... G06F 1/163; G09B 21/008; H04N 5/2252; H04N 5/2253; H04N 5/2254; H04N 5/2259; H04N 5/23212; H04N 5/23241; H04N 5/23293; H04N 5/23296
See application file for complete search history.

(56) References Cited

U.S. PATENT DOCUMENTS

2012/0218301 A1* 8/2012 Miller ................. G02B 27/017
345/633

* cited by examiner

Primary Examiner — Andy Rao
Assistant Examiner — Tyler Edwards
(74) Attorney, Agent, or Firm — Vista IP Law Group LLP (57) ABSTRACT A vision aid device comprises a housing, an eyepiece for holding up to an eye and viewing into the vision aid device, a camera mounted within the housing, a controller and memory operably coupled to the camera, a motion sensor operably coupled to the controller and a display operably coupled to the controller. The controller is configured to: activate the camera to capture an electronic image; store the electronic image in the memory; display on the display a magnified image which is a magnified view of the electronic image; and electronically pan the electronic image from the magnified image to display successive magnified images based on motion information generated by the motion sensor, the motion information based on motion of the vision aid device as sensed by the motion sensor.

27 Claims, 6 Drawing Sheets

PORTABLE VISION AID WITH MOTION PAN

BACKGROUND

The field of the invention generally relates to vision aids for allowing persons with low vision to see by enhancing an image of interest, and more specifically to a portable vision aid which can capture an image, display a portion of a magnified (enlarged) version of the image, and pan around the magnified image in response to motion of the portable vision aid.

Various vision aids exist to provide improved viewing of subject matter within a field of view of the vision aid by magnifying (enlarging) the perceived field of view. Many such aids allow those with impaired vision to view printed materials (e.g., books and magazines), digital displays (e.g., LCD, LED, or other monitors), and photographs by creating magnified images of the material or images of the material which may also include enhanced color contrast and/or brightness. This may be useful for people with difficulty in reading, due to blurred vision, macular degeneration, or other vision impairments.

Existing viewing aids typically include a camera, and a viewing surface within a field of view of the camera. If the material remains at a fixed location on the viewing surface, then either the camera is moved relative to the viewing surface (and material), or the viewing surface (and material) is moved relative to the camera. If the material rests freely on the viewing surface, then the material itself may also be moved relative to the camera (and viewing surface). In either case, successive images of the material captured by the camera are either projected on a separate screen such as with CCTV systems, or on a display integrated with the camera.

For those viewing aids involving movement of the camera, the precision required to position the camera to capture images of the target portion(s) of the material may be difficult to achieve in many situations. This may be especially so if the material is printed material intended for reading, and even more so for those who have macular degeneration and need the image to be enlarged, and/or those with motor skill impairments and/or difficulty with hand-eye coordination. The same is true for those viewing aids involving movement of the viewing surface and/or material, as is done with X-Y tables.

A number of portable low vision devices have also been developed for general vision situations (i.e., not viewing reading material or subject matter on a viewing surface). These portable low vision devices typically utilize electronic video cameras which are mounted in a fixture, such as a helmet or goggle that can be worn on the user's head, or a handheld instrument fixture. The devices have a display for displaying a magnified image of the video captured by the video camera. The image of the field of view being displayed by such devices is changed by adjusting the field of view of the video camera to obtain video of a different field of view. This can make it very challenging to keep the video camera steady and/or trained at a particular field of view, and even more so when a user is trying to adjust the device, such as the level of magnification, while viewing and scanning the desired field of view. Hence, these types of devices can be awkward and difficult to use, especially for persons already having low vision.

SUMMARY

The present invention is directed to an innovative portable vision aid device which allows a user to view magnified video through the device, freeze an image of a desired field of view, and then adjust the magnification of the image and pan the image to view successive magnified images based on motion of the vision aid device as sensed by a motion sensor on the vision aid device. For example, if the user moves the vision aid device to the right, the image is panned to the right to display a magnified image of the portion of the initial image to the right of the previously displayed magnified image. In one aspect, the vision aid device can be configured such that the initial image is panned in a manner which simulates the motion of the vision aid device as sensed by the motion sensor. As used herein, the term "simulate" and its other grammatical forms, with respect to panning the electronic image based on motion of the vision aid device as sensed by the motion sensor, means that the panning is in substantially the same direction as the motion of the vision aid device and the speed of the panning is proportional (or otherwise suitably correlated) to the speed of the motion of the vision aid device. In other words, if the vision aid device is moved to the right, then the electronic image being displayed is panned to the right; and if the vision aid device is moved upward, then the electronic image being displayed is panned upward, and so on for any direction of motion of the vision aid device. Similarly, with respect to speed, if the vision aid device is moved slowly, then the electronic image is panned at a proportionally slow rate, and if the vision aid device is moved faster, then the electronic image is panned at a proportionally faster rate.

In one embodiment, the portable vision aid device comprises a housing for mounting and protecting the other components. An eyepiece may be disposed on the housing and is configured to be held in close proximity to an eye of the user for viewing a display mounted within the housing. A camera is mounted within the housing. The camera is configured to capture an electronic image of subject matter in a field of view at which the vision aid device is directed. The camera typically comprises an electronic imaging device, such as a CCD sensor (charge-coupled device) or CMOS sensor (complementary metal-oxide-semiconductor) and optics configured to focus the subject matter in the field of view onto the electronic imaging device. A memory for storing the electronic images captured by the camera is operably coupled to the camera and configured to store electronic images captured by the camera.

A controller for controlling the operation of the vision aid device is operably coupled to the memory, the camera and other functional components as described herein. The controller comprises a processor and software for operating the vision aid device. A motion sensor is operably coupled to the controller and is configured to sense motion of the vision aid device and to provide motion information to the controller based on the sensed motion. In addition, a display, such as an LCD (liquid crystal display), OLED display (organic light emitting diode), AMOLED display (active-matrix OLED), or other suitable display, for displaying video and still images captured by the camera is mounted within the housing and is viewable through the eyepiece. The display is operably coupled to the controller.

The controller is configured to activate the camera to capture an initial electronic image of the subject matter in the field of view. This may be in response to a user actuating a button or other user input device or simply by turning on the device through a power switch. The controller stores the initial electronic image in the memory. The controller then generates a first magnified image of at least a first portion of the initial electronic image and displays the first magnified image on the display in a substantially full-screen mode (i.e., the first magnified image extends over substantially the entire area of the display) and includes only a first portion of the initial electronic image that is less than the full initial electronic image. The controller is further configured to electronically pan the initial electronic image from the first magnified image to display on the display one or more successive magnified images based on motion information generated by the motion sensor, the motion information based on motion of the vision aid device sensed by the motion sensor.

The initial electronic image and video may already be magnified from the unaided perceived view of the user. The natural perceived field of view is an image in which the objects would be the same size as would be perceived by the unaided eyes of the user ("unaided eyes" may include refractive correction, e.g. eyeglasses, which correct for refractive error). Accordingly, the vision aid can be adjusted to set the zoom such that the image displayed on the display of the device appears to the user to be substantially the same size as the user's view of the field of view with the unaided eyes of the user. The zoom of the vision aid device can also be adjusted to magnify the image displayed on the display compared to the natural perceived view or even shrink the image displayed on the display compared to the natural perceived view.

As described herein, the controller may be configured to pan the initial electronic image from the first magnified image in a manner which simulates motion of the vision aid device as sensed by the motion sensor. For instance, the user may hold the vision aid device up to the user's eye (or eyes in the case of a binocular device) and view the first magnified image on the display. As the user moves the vision aid device while still looking through the eyepiece(s) at the display, the motion sensor senses the motion and provides motion information (data) to the controller. The controller processes the motion information and determines the motion of the vision aid device as sensed by the sensor. The controller then pans the initial electronic image from the first magnified image being displayed on the display to display one or more successive magnified images to simulate the direction and speed of motion of the vision aid device as sensed by the sensor. For instance, if the user moves the vision aid device to the right so as to scan to the right of the then-current magnified image being displayed, the controller pans to the right of the initial electronic image to display the portion of the initial electronic image that is to the right of the then-current magnified image being displayed. In addition, if the user moves the vision aid device slowly as sensed by the motion sensor, then the controller pans the initial electronic image proportionally slowly, and if the user moves the vision aid device more quickly as sensed by the motion sensor, then the controller pans the initial electronic image proportionally more quickly.

In another aspect, the vision aid device may be configured to activate the camera to take video of the subject matter in the field of view of the camera and to display the video on the display. In this way, the user can view the display through the eyepiece and move the vision aid device to move the field of view of the camera while viewing the field of view on the display. In order to utilize the image panning feature described above, the vision aid device further comprises an image capture input device coupled to the controller and operable by the user. When the user desires to freeze the video and to view a pannable, magnified image, the user activates the image capture input device. The controller receives a capture command from the image capture input device and activates the camera to capture an initial electronic image of the subject matter in the field of view.

In another aspect, the vision aid device further comprises a zoom control device operably coupled to the controller and operable by the user. The controller is further configured to receive a zoom command from the zoom control device and to adjust the magnification of the first magnified image and successive magnified images displayed on the display in response to the zoom command. For instance, the zoom control device may be a two-way toggle switch, in which one direction zooms in on the image (increases the magnification), and the other direction zooms out on the image (decreases the magnification).

In still another aspect, the vision aid device may further comprise a finder input device operably coupled to the controller and operable by the user. When the user activates the finder input device, the controller receives a finder command and toggles between displaying on the display a magnified image of the initial electronic image and the full initial electronic image. This allows the user to conveniently determine to which part of the full initial electronic image the magnified image corresponds.

In yet another aspect, the vision aid device is powered by a battery disposed within the housing. The battery may be disposable or re-chargeable, and replaceable or permanently mounted. The vision aid device may also be handheld such that a user can comfortably hold the entire device up to the user's eye(s) and operate the vision aid device to view video and still images and also to pan magnified images by moving the vision aid device, as described herein.

In another embodiment, a vision aid device according to the present invention is configured to display a binocular view on a pair of displays with each display positioned in front of a respective eye of a user. The binocular version of the vision aid device has most of the same components as the monocular version described above. The vision aid device comprises a headset having a housing configured to be worn on a user's head. For example, the housing may include a pair of temples, similar to the temples of a pair of eyeglasses, such that the vision aid device may be worn similar to eyeglasses.

A camera is mounted within the housing and is configured to capture an electronic image of subject matter in a field of view at which the vision aid device is directed. The camera comprises an electronic imaging device and optics configured to focus the subject matter in the field of view onto the electronic imaging device. A memory is operably coupled to the camera and is configured to store electronic images captured by the camera. A controller is operably coupled to the memory and comprises a processor and software for operating the vision aid device. To provide a binocular view, a pair of displays is mounted within the housing and located such that the each display is positioned in front of a respective eye of a user when the headset is worn on a user's head. The displays are operably coupled to the controller, and are configured to display electronic images viewable by the user when the headset is worn on the user's head. A motion sensor is disposed on the housing and is operably coupled to the controller. The motion sensor is configured to sense motion of the headset and to provide motion information to the controller based on the sensed motion. The controller is configured to operate the binocular vision aid device in substantially the same manner as the monocular version, except that the images are displayed on each of the two displays.

In another aspect, the binocular vision aid device may include an external electronic pod which is separate from the headset and which houses most of the electronic components of the vision aid device, such as the controller, memory, battery, etc., but the motion sensor remains disposed on the headset so that it senses the motion of the headset. The electronic pod is operably coupled to the headset via a cable, or via wireless communications. In addition, the binocular vision aid device may include any of the additional features and aspects described above for the single display version of the vision aid device.

BRIEF DESCRIPTION OF THE DRAWINGS

The invention is illustrated by way of example and not limitation in the figures of the accompanying drawings, in which like reference numbers refer to similar elements, and in which.

DETAILED DESCRIPTION

Turning to FIGS. 1-5, one embodiment of a vision aid device 10 according to the present invention is shown. The vision aid device 10 comprises a housing 12, which in the example embodiment of FIGS. 1-5, is an elongated shell with a plurality of mounts. The mounts may be pads, mounting holes (e.g., threaded, through-holes, etc.), or other structure for attaching the various components of the vision aid device 10 to the housing 12. The housing 12 may be made of any suitable polymer, such as a molded polymer, or metal (cast, manufactured, forged or other process of forming), or other suitable material.

Figure 1:
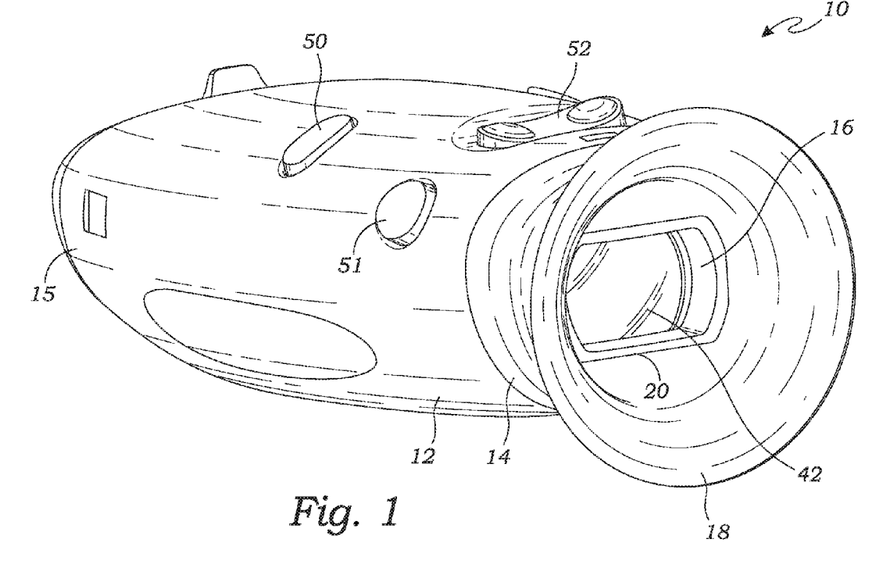
FIG. 1 is a left side, front perspective view of a vision aid device, according to one embodiment of the present invention.
Figure 2:
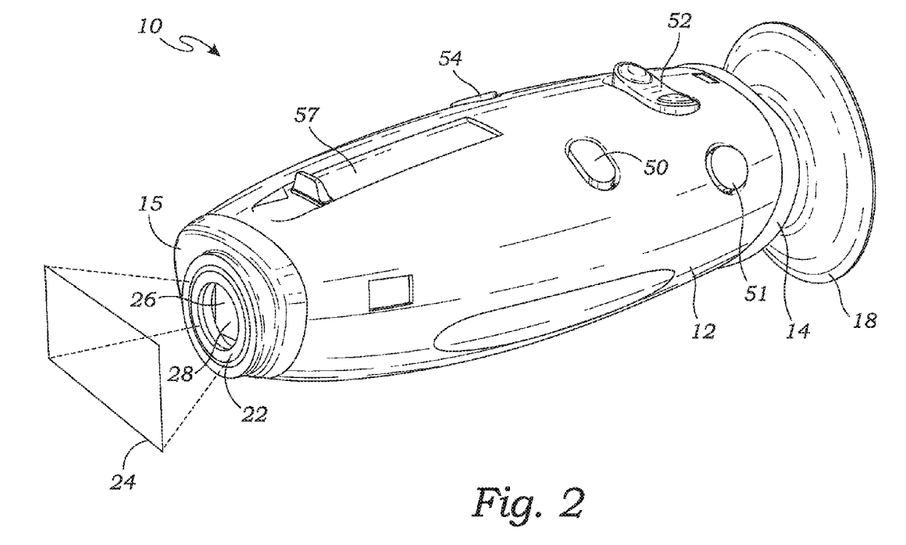
FIG. 2 is a right side, back perspective view of a vision aid device, according to one embodiment of the present invention.
Figure 3:
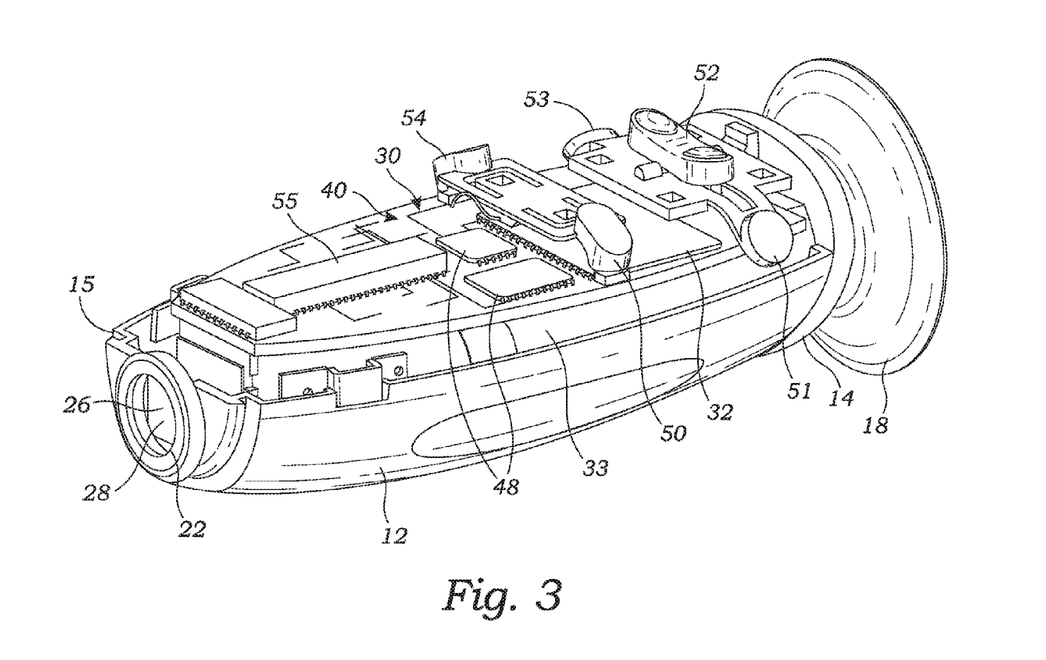
FIG. 3 is a side perspective, transparent view of the vision aid device of FIG. 1.

The housing 12 has a proximal end 14 (first end) having a proximal aperture 16. An eyepiece 18 is disposed on the proximal end 14 of the housing 12. The eyepiece 18 has an eyepiece aperture 20 which is aligned with the proximal aperture 16 such that a user can view through the proximal aperture 16 through the eyepiece aperture 20. The eyepiece 18 may be formed of a pliable, resilient material (e.g., rubber, plastic, silicone, etc.) which can be held in place against a user's face, or in close proximity to the user's eye, and the user can then view through proximal aperture 16 and eyepiece aperture 20.

The housing 12, and thus the complete vision aid device 10, is sized to be conveniently handheld so that a user can easily hold the vision aid device 10 up to the user's eye (or eyes in the case of a binocular embodiment) to aim and view the vision aid device 10 at a desired scene. Accordingly, the vision aid device 10 is generally less than 6 inches in length, less than 2 inches in diameter (or in width and height, depending on the shape) and less than 0.5 pounds in weight.

A camera 22 is mounted within the housing 12 at the distal end 15 of the housing 12. The housing 12 has a distal aperture aligned with the camera 22 to allow light from the field of view to project onto the camera 22. The camera 22 is configured to capture an electronic image of subject matter in a field of view 24 at which the vision aid device 10 is directed. The camera 22 comprises an electronic imaging device 26 such as a charge-coupled device (CCD) or CMOS (complementary metal-oxide-semiconductor), or other electronic imaging device for detecting light focused on the imaging device 26 and converting the detected light into an electronic image. The camera 22 also has optics 28 configured to focus the subject matter in the field of view 24 onto the electronic imaging device 26. The optics 28 may comprise a fixed focal length or an adjustable focal length (e.g., an auto-focusing device, manually adjustable focus, etc.).

Figure 4:
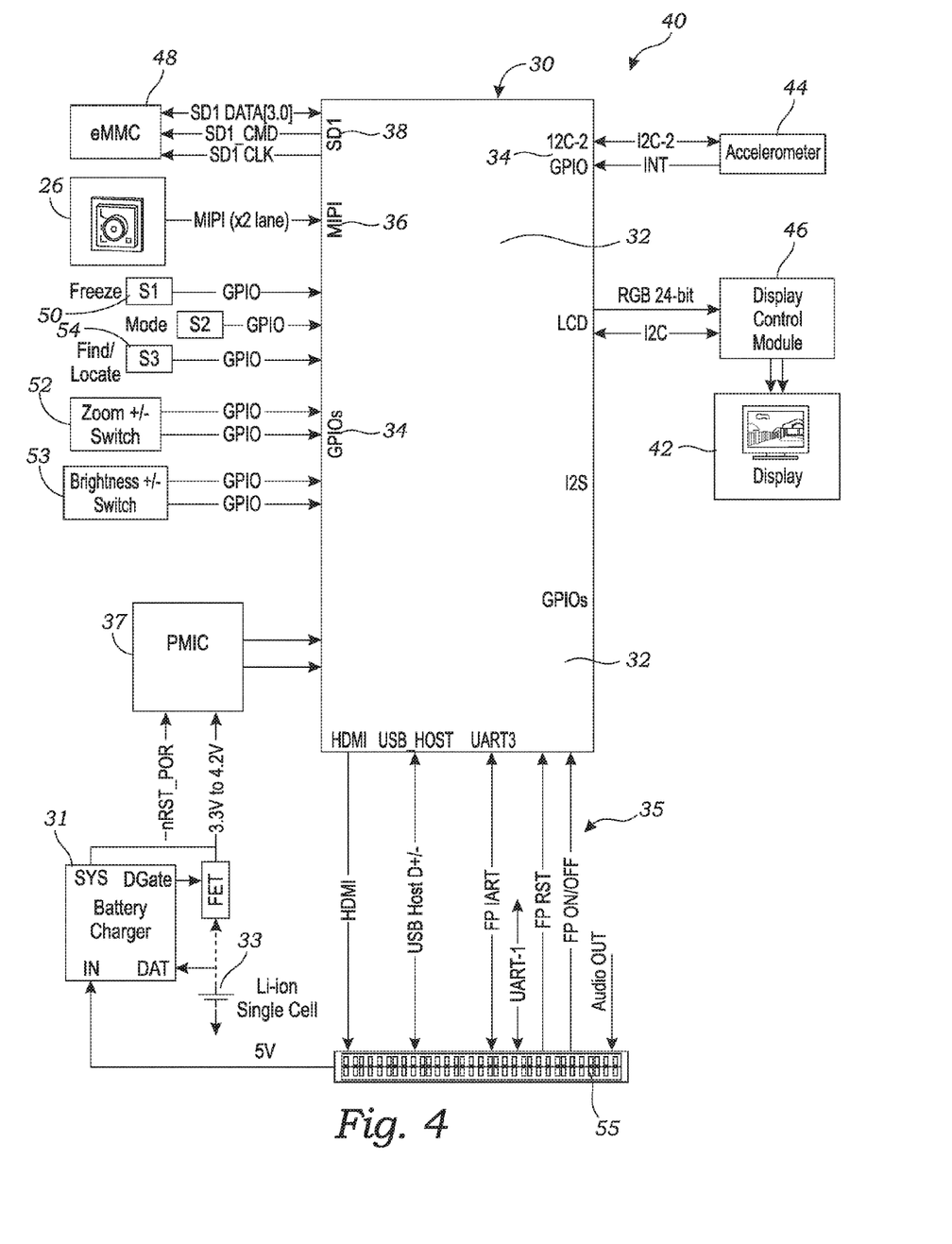
FIG. 4 is block diagram of the electronic system of the vision aid device of FIG. 1.

The vision aid device 10 also has a controller 30 which processes the images captured by the camera 22, displays images on the display 42 (as described below), and controls the overall operation of the vision aid device 10. Turning to FIG. 4, a block diagram of the electronic system 40 of the vision aid device 10, including the controller 30, is shown. The controller 30 may comprise one or more printed circuit boards ("PCBs") and electronic components mounted on the PCBs. The controller 30 includes a microprocessor 32 having general purpose input/output pins/ports 34 ("GPIOs"), a MIPI interface 36 for interfacing with the camera 22, a secure digital memory interface 38, a display control module 46, and other interfaces, ports, functions and features. The microprocessor 32 may be any suitable microprocessor, such as an ARM processor, for instance the iMX6 microprocessor available from Freescale Semiconductors, or other microprocessor.

A memory 48 is operably coupled to the camera 22 via the controller 30. The memory 48 may be any suitable memory, which is preferably a non-volatile memory such as an electronic multi-media card ("eMMC"), including any of flash storage, secure digital memory card, USB memory, etc. The controller 30 is configured to process the images captured by the camera 22 and then store the images in the memory 48. Accordingly, the memory is configured to store electronic images captured by the camera 22 via the controller 30.

A motion sensor 44 is operably coupled to the controller 30 via a GPIO and/or other suitable interface with the microprocessor 32. The motion sensor 44 is configured to sense motion of the vision aid device 10 and to provide motion information to the controller 30 based on the sensed motion. For example, the motion sensor 44 may be a multi-axis accelerometer, such as a microelectromechanical system (MEMS) on a chip design, such as the "multi-axis accelerometer on a chip" products available from Invensense, Inc., STMicroelectronics, Inc., Robert Bosch GmbH, etc.

A display 42 is mounted within the housing 12. The display 42 is configured to display electronic images which are viewable by the user through the eyepiece 18 of the vision aid device 10. The display 42 may be any suitable display, such as an LED display, AMOLED display, etc. The display 42 is operably coupled to the display control module 46 of the controller 30. The display control module 46 is configured to process electronic images stored in the memory 48 and to drive the display 42 to display the electronic images on the display 42.

The vision aid device 10 also has a number of user control input devices for operating the vision aid device 10. A power button or power switch is disposed on the housing 12 and is operably coupled to the controller 30 for turning the vision aid device 10 on and off. An image capture button 50 (which may also be referred to as a "freeze" button) is operably coupled to the controller 30. The vision aid device 10 has a default video mode in which the controller 30 activates the camera 22 to take video of the subject matter in the field of view 24 and displays the video on the display 42. This allows the user to view the display 42 by looking through the eyepiece 18 and to move the vision aid device 10 to move the field of view 24 of the camera 22 while viewing the video of the subject matter in the field of view 24 on the display 42. The controller 30 may be programmed to take and/or display the video at a first image resolution which is less than the maximum resolution of the electronic imaging device, and/or less than the maximum resolution of the display 42. The vision aid device 10 may have a mode button 51 to select the various modes of operation, such as video mode, still image mode, zoom mode, etc.

When the user wants to freeze the video and view a pannable and/or magnified image, the user pushes the image capture button 50, and the controller 30 receives a capture command from the image capture button 50. In response to receiving the capture command, the controller 30 activates the camera 22 to capture a still, electronic image of the subject matter in the field of view 24. The controller 30 may be programmed to capture and/or display the still, electronic image at a second image resolution which is higher than the first image resolution. For instance, the controller 30 and camera 22 may not be able to capture and/or display video at a very high resolution (e.g., greater than 800 pixels by 800 pixels), but may be capable of capturing and/or displaying a still image at a very high resolution (e.g., greater than 800 pixels by 800 pixels). The controller 30 and image capture button 50 may be configured to toggle the vision aid device 10 back and forth between capturing and displaying video and capturing and displaying a still image.

The vision aid device 10 also has a zoom switch 52 operably coupled to the controller 30 for controlling the zoom of video and/or images displayed on the display 42. The zoom switch 52 is configured to provide zoom commands to the controller 30, including a "zoom in" command and a "zoom out" command. Thus, the zoom switch 52 may be a two-way toggle switch in which toggling the zoom switch 52 in a first direction provides a zoom in command and toggling the zoom switch 52 in a second direction provides a zoom out command. The controller 30 is configured to receive the zoom commands from the zoom control switch 52 and to adjust the magnification of the video and/or images displayed on the display 42 in response to the zoom commands. For instance, upon receiving a zoom in command, the controller 30 zooms in on the video and/or image displayed on the display (increases the magnification), and upon receiving a zoom out command the controller 30 zooms out on the image (decreases the magnification).

The vision aid device 10 may also have a finder button 54 operably coupled to the controller 30 and operable by the user. The finder button 54 provides a finder command to the controller 30. In response to the finder command, the controller 30 toggles between displaying on the display 42 a magnified view of a video and/or image and an unmagnified view of the same video and/or image (i.e. the full extent of the video and/or image being displayed on the display 42). When the user is viewing a magnified version of a video or image, the user can conveniently toggle the finder button 54 to view the full extent of the video or image in order to determine to which part of the full video or image the magnified image corresponds. Upon releasing the finder button 54, the controller 30 then displays the previous magnified image. By using the finder button 54, the user can view the full video or image quickly, without having to incrementally zoom out to the full video or image as would be required if using the zoom switch 52.

In addition to the software programming described above, the controller 30 includes software programming to operate the vision aid device 10, including activating the camera 22 to capture video and still images, storing the video and images in the memory 48, and displaying on the display 42 video and images captured by the camera 22. The software programming for the controller 30 also configures the controller 30 to modify the video and still images, including magnifying the images and displaying the magnified images on the display 42.

The software programming for the controller 30 also configures the controller 30 to receive and process the motion information generated by the motion sensor 44. For instance, the controller 30 is programmed to electronically pan an electronic image based on the motion of the vision aid device 10. The controller 30 receives the motion information from the motion sensor 44 and electronically pans an electronic image to display on the display 42 one or more successive images based on motion information generated by the motion sensor 44. The controller 30 may be configured to electronically pan an electronic image in a manner which simulates the motion of the vision aid device 10, as sensed by the motion sensor 44, as described herein.

As shown in FIG. 3 and in the block diagram of FIG. 4, the vision aid device 10 is fully powered by a battery 33 disposed within the housing 12. The battery 33 may be disposable or re-chargeable, and replaceable or permanently mounted. In the case of a re-chargeable battery 33, the electronic system 40 also has a battery charger module 31 for charging the battery 33.

The electronic system 40 also has a power management integrated circuit (PMIC) 37 configured to manage the power systems of the electronic system 40, including controlling the power of the battery to the controller 30 and each of the components of the controller 30. The electronic system 40 may also have various input/output ports 35 for power input/output, video/audio input/output and data input/output.

Turning to FIGS. 6-9, another embodiment of a vision aid device 70 is illustrated in which the vision aid device 70 utilizes a binocular headset 72. The vision aid device 70 has many of the same components as vision aid device 10, wherein like reference numbers refer to like elements, and the description above for such like elements applies equally to the vision aid device 70. The headset 72 of the vision aid device 70 comprises a main housing 12 which is configured to be worn over the eyes on a user's face. The housing 12 has a nose piece 71 which is configured to rest on a user's nose while wearing the headset 72. The headset 72 has two eyepieces 18, two displays 42, and a camera 22 mounted on the housing 12.

Figure 6:
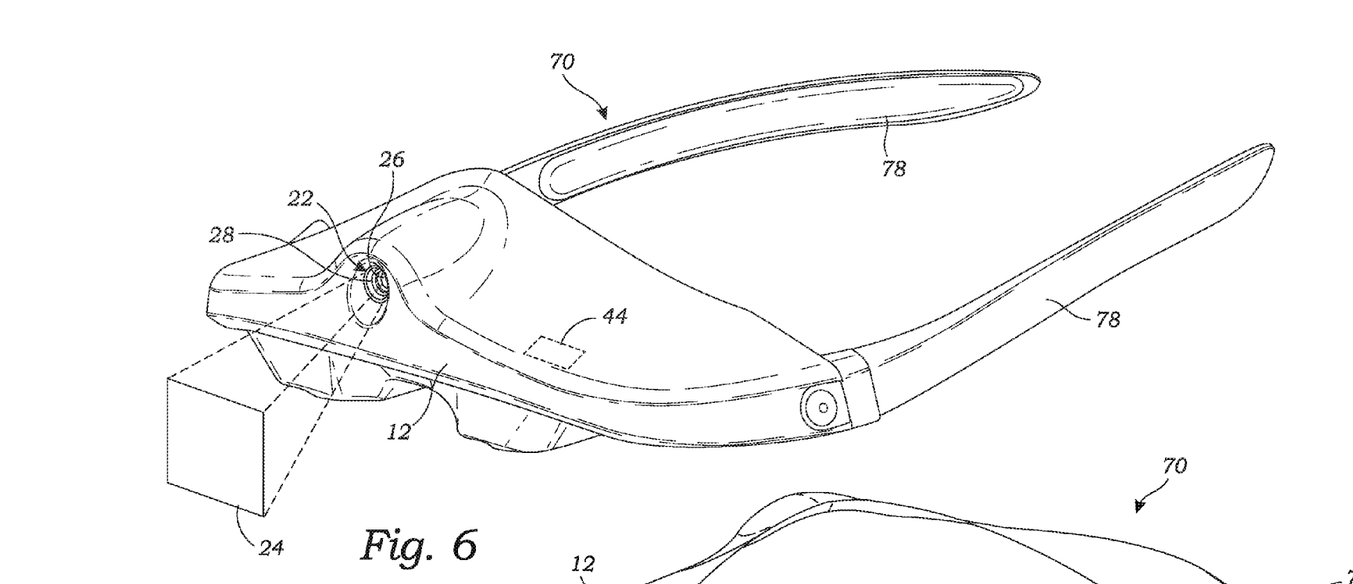
FIG. 6 is a front perspective view of a vision aid device configured to be worn on a user's head, according to another embodiment of the present invention.
Figure 7:
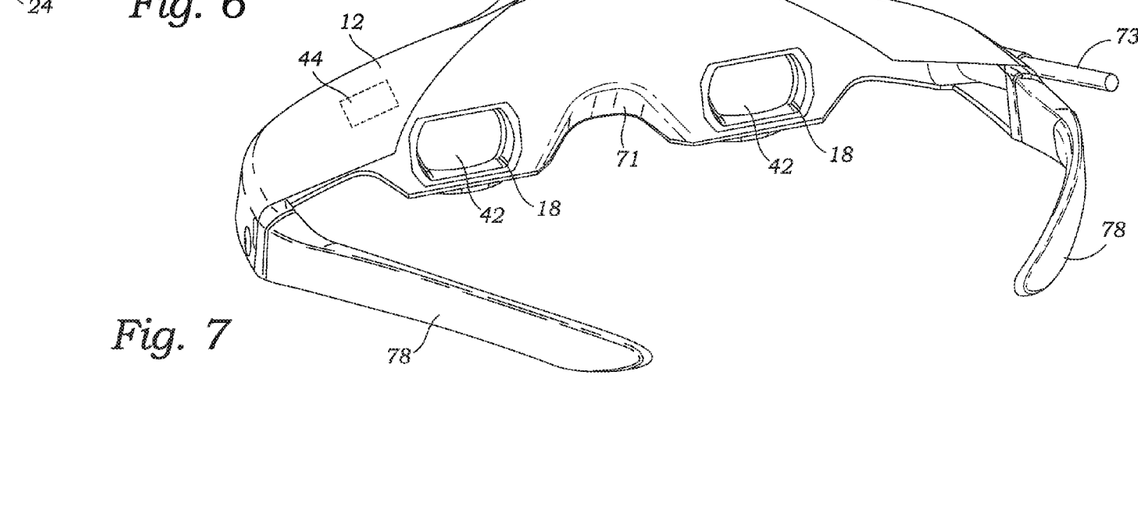
FIG. 7 is a rear perspective view of the vision aid device of FIG. 6.

The headset 72 has two opposing arms/temples 78 same or similar to eyeglasses which extend from the main housing 12. Alternative to the eyeglass style design, headset 72 may be configured as goggles or other head mounted device having a head strap so that the headset 72 can be worn on the user's head over the user's eyes.

The vision aid device 70 also includes an electronic system 40 which is contained in an electronic pod 74 (see FIGS. 8 and 9) which connects via a cable 76 to a connector 73 on the headset 72. The cable 76 transmits electric power and electronic communication signals between the components of the electronic system 40 within the electronic pod 74 and the electronic components of the headset 72 (e.g., the displays 42 and the motion sensor 44). Alternatively, the headset 72 and electronic pod 74 may be configured to communicate wirelessly such as via WiFi or Bluetooth. In such case, the headset 72 includes a wireless communication module and a battery for powering the headset 72.

Figure 8:
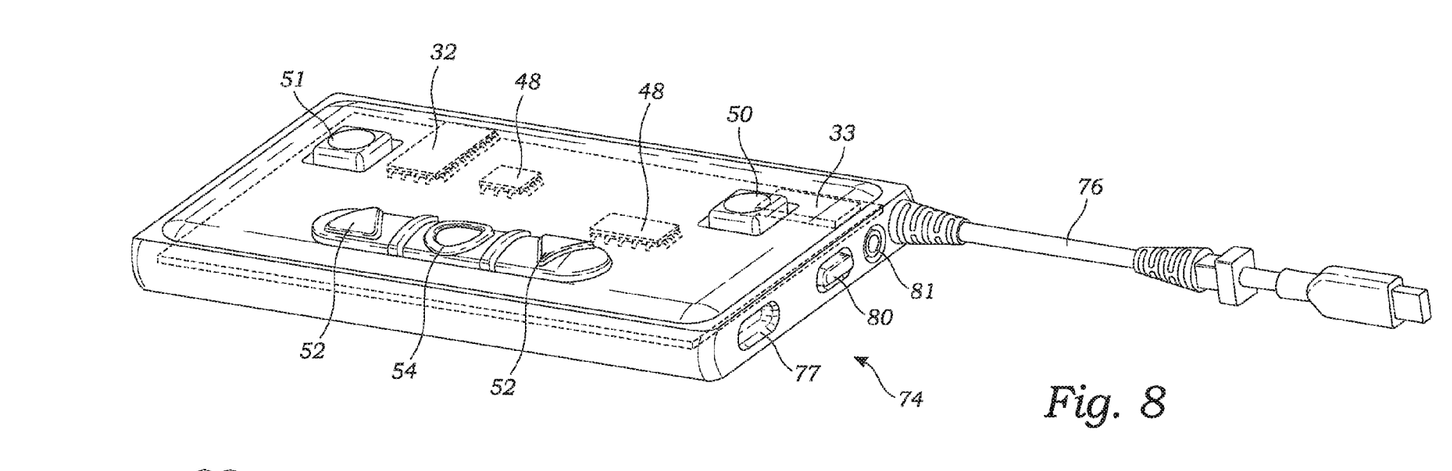
FIG. 8 is a right side perspective view of an electronic pod for the vision aid device of FIG. 6.
Figure 9:
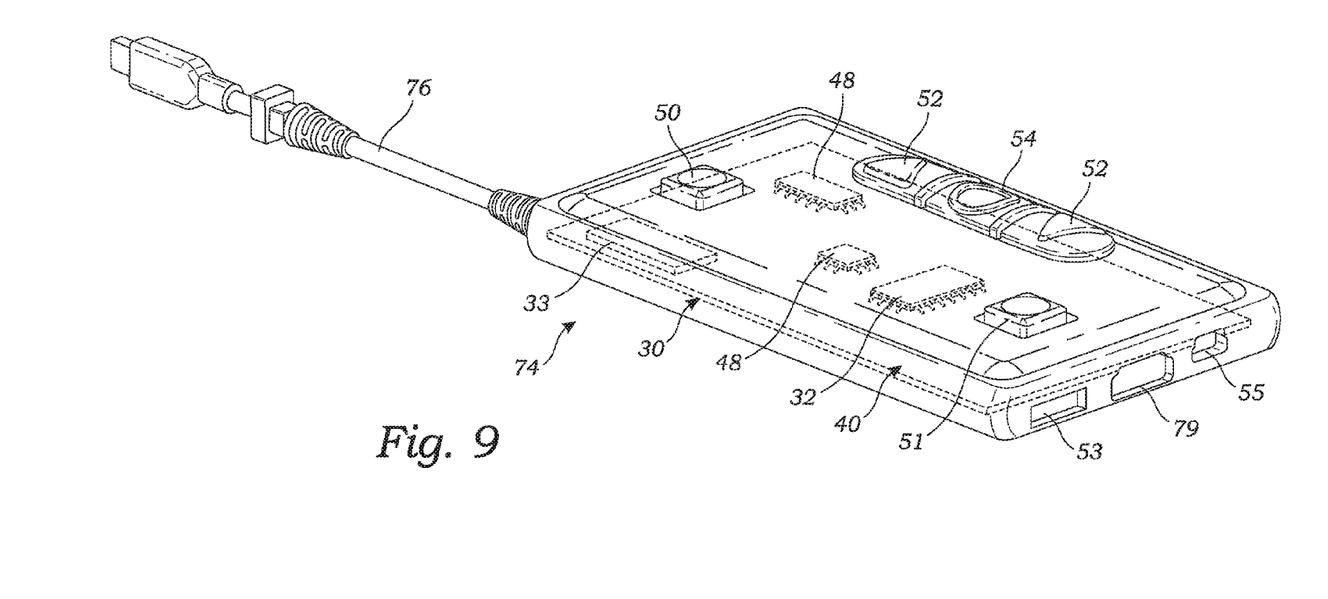
FIG. 9 is a left side perspective view of the electronic pod of FIG. 8.

Housing most of the components and the battery 33 of the electronic system 40 in the external electronic pod 74 allows the headset 72 to be much lighter than locating all of components of the vision aid device 70 in the headset 72.

The electronic system 40 is essentially the same as the electronic system 40 for the vision aid device 10, except that it is configured to display images on both of the displays 42. Thus, the electronic system 40 of the vision aid device 70 may include all of the components and functionality of the electronic system 40 of the vision aid device 10, as described herein.

The motion sensor 44 of the electronic system 40 is disposed in the headset 72 such that the movement of the headset on a user's head is sensed by the motion sensor 44. The motion sensor 44 is operably coupled to the controller 30 via the connector 73, the cable 76 (or other communication mode, such as wireless WiFi, Bluetooth, etc.) and the GPIO and/or other suitable interface with the microprocessor 32. The motion sensor 44 is configured to sense motion of the headset 72 of the vision aid device 70 and to provide motion information to the controller 30 based on the sensed motion.

The electronic system 40 of the vision aid device 70 may also include features and components which are not included in the vision aid device 10 described above. It is understood that the vision aid device 10 may also include these additional features. The electronic pod 74 has a power button or power switch 80 which is operably coupled to the controller 30 for turning the vision aid device 70 on and off. The electronic pod 74 also has a video output connector 77 (e.g., an HDMI connector) operably coupled to the controller 30, and the controller 30 is configured to output an audio/video signal (see FIG. 4). The electronic pod 74 also has a video input connector 79 (e.g., an HDMI connector) operably coupled to the electronic controller 30 and the controller 30 is configured to receive an input audio/video signal and display the video on the displays 42 and play the audio through the audio jack 81 to which headphones or other audio listening device can be connected (see FIG. 4).

The controller 30 of the vision aid device 70 is configured to capture, process, magnify, display and pan images from the camera 22 in the same manner as the controller 30 of the vision aid device 10. The user can then view, capture, zoom and pan the images simultaneously displayed on the respective displays 42 by movement of the vision aid device 70.

In an alternative embodiment, all of the electronic system 40, including the controller 30 and other components of the electronic system 40 may be incorporated into the headset 70, thereby eliminating the need for the electronic pod 74. However, this will typically make the headset 70 heavier, which may make the headset 70 less comfortable than using an external electronic pod 74 as described herein.

In another alternative embodiment, the vision aid device 70 may have two cameras 22 which are offset on the headset 72, such as having camera 22 placed in line with each of the displays 42. The controller 30 of the vision aid device 70 may then be configured to allow the user to view, capture, zoom and pan an image captured by the camera 22 and display the images on the respective displays 42 in a synchronized manner to provide a binocular viewing experience (i.e., a three-dimensional image).

Figure 5:
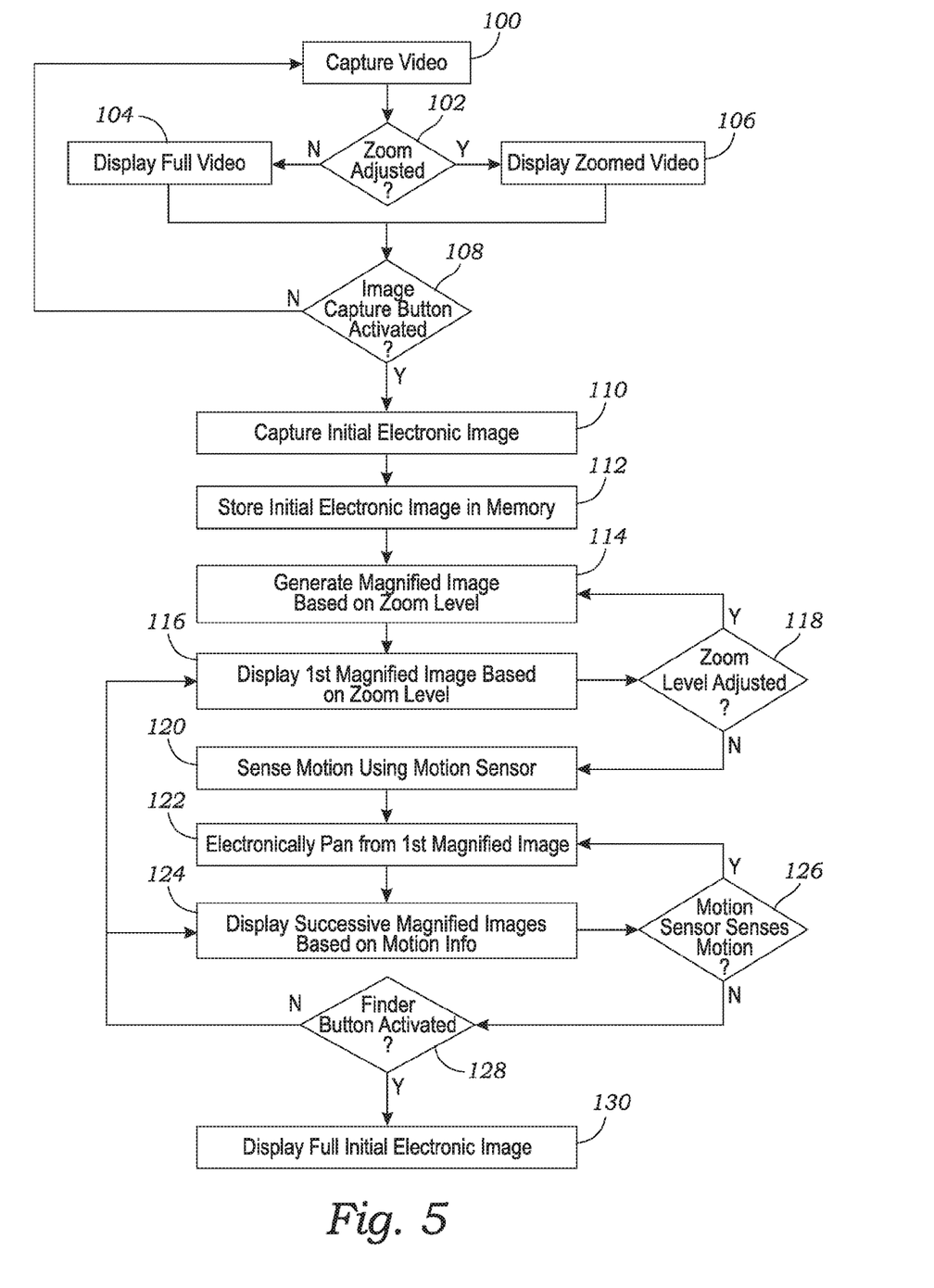
FIG. 5 illustrates a flowchart of the operation and use of the vision aid device of FIG. 1.

Turning to FIG. 5, the use and functions of the vision aid devices 10 and 70 will be described with reference to the flowchart of FIG. 5. The use and functions of the vision aid device 10 and the vision aid device 70 are substantially the same, so the use will be described with respect to the vision aid device 10, with the understanding that the description applies equally to the vision aid device 70. At step 100, the vision aid device 10 is powered on and the controller 30 activates the camera 22 to capture video. At step 102, the controller 30 determines whether the zoom has been adjusted, such as by the user adjusting the zoom switch 52. If the zoom level has not been adjusted such that it is set to no zoom, then at step 104, the controller 30 displays the full extent of the video being captured by camera 22 on the display 42.

If the zoom level has been set to zoom in on the video (i.e., display a magnified view), such as by the user adjusting the zoom using the zoom switch 52, then at step 106, the controller 30 magnifies the video and displays zoomed in (magnified) video of the video captured by the camera 22. In this video mode, the controller 30 will typically display the magnified portion of the video in the middle of the full extent of the video, but the controller 30 can also be configured to display other portions of the video. The zoom level may be further adjusted from a current zoom level for viewing the video, in which case the controller 30 magnifies the video according to the zoom level (which may be no zoom and no magnification), and displays the video magnified according to the selected zoom level. For instance, upon receiving a zoom in command, the controller 30 zooms in on the video displayed on the display (increases the magnification), and upon receiving a zoom out command the controller 30 zooms out on the image (decreases the magnification).

At step 108, the controller 30 determines whether the image capture button 50 has been activated. If the image capture button 50 is not activated, the vision aid device 10 continues to capture and display video as described above. When the image capture button 50 is activated, the controller 30 receives a capture command from the image capture button 50. At step 110, in response to the capture command, the controller 30 activates the camera to capture a still, electronic image of the subject matter in the field of view 24, referred to as an initial electronic image. As described above, the initial electronic image may be captured at a higher resolution than the video resolution.

At step 112, the controller 30 stores the initial electronic image in the memory 48. The camera 22 and/or the controller 30 may perform some image processing on the image captured by the camera 22 prior to storing the initial electronic image in the memory 48.

At step 114, the controller 30 generates a first magnified image of the initial electronic image to be displayed on the display 42. The controller 30 may generate and display the magnified image in any suitable manner. For example, in one way, the controller 30 may generate a full magnified image of the full initial electronic image, and then display on the display only a selected portion of the full magnified image which is less than the full magnified image (and also less than the full initial electronic image). Alternatively, the controller 30 may determine a first portion of the initial electronic image to display which is less than the full initial electronic image. The controller 30 then magnifies the first portion to generate a first magnified image to be displayed on the display 42, and displays the first magnified image on the display. The portion of the initial electronic image to be used for generating the first magnified image to be displayed may default to the middle portion of the full initial electronic image. Alternatively, the controller 30 may display the full initial electronic image on the display 42 and then provide a moveable cursor, pointer, selection box, or other selection device, which the user can move using a directional input device disposed on the vision aid device 10 (e.g., joystick, directional pad, etc.), or by moving the vision aid device 10 as sensed by the motion sensor 44. The user can then select the desired portion to be displayed as the first magnified image by depressing a selection button when the moveable selection device indicates the desired portion of the full initial electronic image. The controller 30 generates the first magnified image based on a current zoom level, which may be a default zoom level or a zoom level selected by the user using the zoom switch 52.

Then, at step 116, the controller 30 displays the first magnified image on the display 42 based on the current zoom level, which may be a default zoom level or a zoom level selected by the user using the zoom switch 52, as described above. At step 118, the controller 30 determines whether the zoom level is adjusted while displaying the first magnified image. If the user adjusts the zoom level, then the controller 30 generates and displays a magnified image based on the adjusted zoom level, i.e., the controller 30 repeats steps 114 and 116, as indicated in the flowchart of FIG. 5. If not, the process continues to step 120.

At step 120, while displaying the first magnified image, the controller 30 monitors the motion sensor 44 and receives motion information from the motion sensor 44. At step 122, the controller 30 receives and processes the motion information and then electronically pans the initial electronic image from the first magnified image and at step 124, the controller 30 displays on the display 42 one or more successive portions of the initial electronic image based on the motion information generated by the motion sensor 44. As described above, the controller 30 may be configured to electronically pan the initial electronic image in a manner which simulates the motion of the vision aid device 10, as sensed by the motion sensor 44. The successive magnified images may also be generated and displayed by the controller in various manners, as described above for the generation and display of the first magnified image. In other words, the controller 30 may magnify the entire initial electronic image to generate a magnified image of the full initial electronic image, and then determine which portions of the full initial electronic image to display based on the motion information generated by the motion sensor, while panning. Alternatively, the controller 30 may determine successive portions of the full initial electronic image to display based on the motion information generated by the motion sensor panning, and then magnify each portion for display, while panning.

At step 126, the controller 30 continuously monitors the motion sensor 44 and receives motion information from the motion sensor 44, and then electronically pans to display successive magnified images, as described above with respect to steps 122 and 124. This is illustrated in the flowchart of FIG. 5 by the loop beginning at step 124 and returning to step 122 via step 126.

If no motion is detected, then at step 128, the controller 30 determines whether the finder button 54 has been activated. If the finder button 54 has been activated, the controller 30 receives a finder command from the finder button. In response to the finder command, at step 130, the controller 30 toggles between displaying the currently displayed magnified image (e.g., the first magnified image or a successive magnified image) and the full, initial electronic image (i.e., the full extent of the initial electronic image). For example, while the controller 30 is displaying a successive magnified image, the user pushes the finder button 54, and the controller 30 then displays the full, initial electronic image. When the user releases the finder button 54, the controller 30 reverts and displays the previously displayed successive magnified image. As described above, the controller 30 may also be configured to utilize the finder button 54 with video to toggle between viewing a zoomed in video or the full extent of the video. By using the finder button 54, the user can view the full video or image quickly, without having to incrementally zoom out to the full video or image and then zoom in to the previous magnified view, as would be required if using the zoom switch 52.

The vision aid device 10 may also have a brightness button 53 operably coupled to the controller 30 and/or the display module 46 for adjusting the brightness of the display 42.

The vision aid devices 10 and 70 may also have a docking connector 55 operably coupled to the controller 30. The docking connector 55 and controller 30 are configured to allow an external device such as a personal computer or smartphone or other computer device to be connected to the vision aid device 10 to perform various functions. For instance, the docking connector 55 may allow images and video stored on the vision aid device 10 to be uploaded to the computer device, or vice versa, or the firmware and software of the vision aid device 10 may be updated using the docking connector 55. An access door 57, such as a sliding door, may be provided on the housing 12 to access the docking connector 55 when opened and to protect the docking connector 55 and enclosed electronics when the access door 57 is closed.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. In addition, the steps of the methods and processes of the present invention are not required to be performed in the order as shown in the figures or as described, but can be performed in any order that accomplishes the intended purpose of the methods and processes. Accordingly, embodiments are intended to exemplify alternatives, modifications, and equivalents that may fall within the scope of the claims. The invention, therefore, should not be limited, except to the following claims, and their equivalents.

What is claimed is:

1. A portable vision aid device, comprising:
   a housing;
   an eyepiece disposed on the housing and configured to be held in close proximity to an eye of a user;
   a camera mounted within the housing and configured to capture an electronic image of subject matter in a field of view at which the vision aid device is directed, the camera comprising an electronic imaging device and optics configured to focus the subject matter in the field of view onto the electronic imaging device;

a memory operably coupled to the camera and configured to store electronic images captured by the camera;

a controller operably coupled to the memory, the controller comprising a processor and software for operating the vision aid device;

a motion sensor operably coupled to the controller, the motion sensor configured to sense motion of the vision aid device and to provide motion information to the controller based on the sensed motion; and a display mounted within the housing and operably coupled to the controller and configured to display electronic images viewable by the user through the eyepiece;

the controller configured to: (1) activate the camera to capture an initial electronic image of the subject matter in the field of view; (2) store the initial electronic image in the memory; (3) display on the display in a substantially full-screen mode a first magnified image which is a magnified view of the initial electronic image in the memory and includes only a first portion of the initial electronic image that is less than the full initial electronic image; and (4) electronically pan the initial electronic image from the first magnified image to display on the display one or more successive magnified images based on motion information generated by the motion sensor, the motion information based on motion of the vision aid device sensed by the motion sensor.

2. The portable vision aid device of claim 1, wherein the controller is further configured to generate a full magnified image of the full initial electronic image and the first magnified image is a portion of the full magnified image and the successive magnified images are other portions of the full magnified image.

3. The portable vision aid device of claim 1, further comprising an image capture input device operably coupled to the controller, and wherein the controller is further configured to:

activate the camera to take video of the subject matter in the field of view and to display the video on the display;

receive a capture command from the image capture input device to activate the camera to capture an initial electronic image of the subject matter in the field of view; and activate the camera to capture the initial electronic image of the subject matter in the field of view in response to receiving the capture command.

4. The portable vision aid device of claim 1, further comprising a zoom control device operably coupled to the controller, and wherein the controller is further configured to:

receive a zoom command from the zoom control device and adjust the magnification of an image displayed on the display in response to the zoom command.

5. The portable vision aid device of claim 1, further comprising a finder input device operably coupled to the controller, and wherein the controller is further configured to:

receive a finder command from the finder input device and to toggle between displaying a magnified image on the display and displaying the full initial electronic image on the display in response to the finder command.

6. The portable vision aid device of claim 1, wherein the motion sensor comprises an accelerometer.

7. The portable vision aid device of claim 1, wherein the controller is further configured to:

determine a first portion of the initial electronic image to display which is less than the full initial electronic image;

magnify the first portion to generate the first magnified image;

display the first magnified image on the display; and pan the initial electronic image from the first magnified image to determine successive portions of the initial electronic image to display based on motion information generated by the motion sensor, magnify the successive portions to create the successive magnified images, and display on the display the successive magnified images.

8. The portable vision aid device of claim 1, wherein the controller is further configured to:

pan the initial electronic image from the first magnified image to display on the display one or more successive magnified images based on motion information generated by the motion sensor in a manner which simulates motion of the vision aid device as sensed by the motion sensor.

9. The portable vision aid device of claim 1, wherein:

the housing is elongated with a first end and a second end and is configured to be handheld;

the eyepiece and display are disposed at the first end of the housing; and the camera is disposed at the second end of the housing.

10. The portable vision aid device of claim 1, wherein the vision aid device is fully powered by a battery disposed within the housing.

11. A handheld vision aid device for generating and displaying an image in a magnified form and panning the image, the vision aid device comprising:

an elongated housing configured to be handheld, the housing having a first end and a second end;

an eyepiece disposed at the first end of the housing and configured to be held in close proximity to an eye of a user;

a camera mounted at the second end of the housing and configured to capture an electronic image of subject matter in a field of view at which the vision aid device is directed, the camera comprising an electronic imaging device and optics configured to focus the subject matter in the field of view onto the electronic imaging device;

a memory operably coupled to the camera and configured to store electronic images captured by the camera;

a controller operably coupled to the memory, the controller comprising a processor and software for operating the vision aid device;

a motion sensor operably coupled to the controller, the motion sensor configured to sense motion of the vision aid device and to provide motion information to the controller based on the sensed motion; and a display mounted at the first end of the housing and operably coupled to the controller and configured to display electronic images viewable by the user through the eyepiece;

the controller configured to: (1) activate the camera to capture an initial electronic image of the subject matter in the field of view; (2) store the initial electronic image in the memory; (3) display on the display in a substantially full-screen mode a first magnified image which is a magnified view of the initial electronic image in the memory and includes only a first portion of the initial electronic image that is less than the full initial electronic image; and (4) electronically pan the initial electronic image from the first magnified image to display on the display one or more successive magnified images in a manner which simulates the motion of the vision aid device based on motion information generated by the motion sensor.

12. The handheld vision aid device of claim 11, wherein the controller is further configured to generate a full magnified image of the full initial electronic image and the first magnified image is a portion of the full magnified image and the successive magnified images are other portions of the full magnified image.

13. The handheld vision aid device of claim 11, further comprising an image capture input device operably coupled to the controller, and wherein the controller is further configured to:
  activate the camera to take video of the subject matter in the field of view and display on the display the video;
  receive a capture command from the image capture input device to activate the camera to capture an initial electronic image of the subject matter in the field of view; and
  activate the camera to capture the initial electronic image of the subject matter in the field of view in response to receiving the capture command.

14. The handheld vision aid device of claim 11, further comprising a zoom control device operably coupled to the controller, and wherein the controller is further configured to:
  receive a zoom command from the zoom control device and adjust the magnification of an image displayed on the display in response to the zoom command.

15. The handheld vision aid device of claim 11, further comprising a finder input device operably coupled to the controller, and wherein the controller is further configured to:
  receive a finder command from the finder input device and to toggle between displaying a magnified image on the display and displaying the full initial electronic image on the display in response to the finder command.

16. The handheld vision aid device of claim 11, wherein the motion sensor comprises an accelerometer.

17. The handheld vision aid device of claim 11, wherein the controller is further configured to:
  determine a first portion of the initial electronic image to display which is less than the full initial electronic;
  magnify the first portion to generate the first magnified image;
  display the first magnified image on the display; and
  pan the initial electronic image from the first magnified image to determine successive portions of the initial electronic image to display based on motion information generated by the motion sensor, magnify the successive portions to create the successive magnified images, and display on the display the successive magnified images.

18. The handheld vision aid device of claim 11, wherein the vision aid device is fully powered by a battery disposed with the housing.

19. A vision aid device, comprising:
  a headset comprising a housing configured to be worn on a user's head;
  a camera mounted within the housing and configured to capture an electronic image of subject matter in a field of view at which the vision aid device is directed, the camera comprising an electronic imaging device and optics configured to focus the subject matter in the field of view onto the electronic imaging device;
  a memory operably coupled to the camera and configured to store electronic images captured by the camera;
  a controller operably coupled to the memory, the controller comprising a processor and software for operating the vision aid device;
  a pair of displays mounted within the housing and located such that each display is positioned in front of a respective eye of a user when the headset is worn on a user's head, the displays operably coupled to the controller, and configured to display electronic images viewable by the user when the headset is worn on the user's head;
  a motion sensor disposed on the housing and operably coupled to the controller, the motion sensor configured to sense motion of the headset and to provide motion information to the controller based on the sensed motion; and
  the controller configured to: (1) activate the camera to capture an initial electronic image of the subject matter in the field of view; (2) store the initial electronic image in the memory; (3) display on both of the displays in a substantially full-screen mode a first magnified image which is a magnified view of the initial electronic image in the memory and includes only a first portion of the initial electronic image that is less than the full initial electronic image; and (4) electronically pan the initial electronic image from the first magnified image to display on both of the displays one or more successive magnified images based on motion information generated by the motion sensor, the motion information based on motion of the vision aid device sensed by the motion sensor.

20. The vision aid device of claim 19, wherein the headset comprises a pair of opposing temples extending from the housing such that the headset may be worn on a user's head similar to a pair of eyeglasses.

21. The vision aid device of claim 19, wherein the controller and memory are disposed in an electronic pod external from the headset, and the electronic pod is operably coupled to the headset.

22. The vision aid device of claim 21, wherein the electronic pod is operably coupled to the headset via a cable.

23. The vision aid device of claim 19, wherein the controller and memory are disposed within the headset.

24. The vision aid device of claim 19, further comprising an image capture input device operably coupled to the controller, and wherein the controller is further configured to:
  activate the camera to take video of the subject matter in the field of view and to display the video on the display;
  receive a capture command from the image capture input device to activate the camera to capture an initial electronic image of the subject matter in the field of view; and
  activate the camera to capture the initial electronic image of the subject matter in the field of view in response to receiving the capture command.

25. The vision aid device of claim 19, further comprising a zoom control device operably coupled to the controller, and wherein the controller is further configured to:
  receive a zoom command from the zoom control device and adjust the magnification of an image displayed on the display in response to the zoom command.

26. The vision aid device of claim 19, further comprising a finder input device operably coupled to the controller, and wherein the controller is further configured to:
   receive a finder command from the finder input device and to toggle between displaying a magnified image on the displays and displaying the full initial electronic image on the displays in response to the finder command.

27. The vision aid device of claim 19, wherein the headset comprises a goggle having a strap.

* * * * *